Patented Dec. 29, 1936

2,066,015

UNITED STATES PATENT OFFICE 2,066,015

MANUFACTURE OF PEROXIDE

James B. Pierce, Jr., Charleston, W. Va., assignor to Barium Reduction Corporation, Charleston, W. Va., a corporation of Delaware No Drawing. Application June 26, 1934, Serial No. 732,439

6 Claims. (Cl. 23—187)

This invention relates to the production of hydrogen peroxide from barium peroxide and has for its principal objects the expeditious and economical manufacture of hydrogen peroxide of a high degree of purity and also of an unusually potent and pure barium peroxide as an intermediate product in such manufacture.

Heretofore in the production of hydrogen peroxide from barium peroxide, it has been customary to first slake the barium peroxide by adding just sufficient water thereto to form a pasty mass, as thereby a substantial proportion of the anhydrous barium peroxide is converted into hydrous barium peroxide, which is considerably more active toward acids to form hydrogen peroxide than is the anhydrous form of barium peroxide. However, such slaking has certain decided disadvantages, since if the anhydrous barium peroxide employed contains any considerable quantity of soluble foreign compounds, such as barium oxide, anhydrous barium hydroxide, barium silicate or the like, all of which are commonly present therein, such compounds either pass directly into solution or suspension in the water employed for the slaking operation, thereby causing a substantial evolution of heat and also in the creation of a strongly alkaline mass with the consequence that the decomposition of barium peroxide with the evolution of oxygen therefrom is promoted. Such decomposition of the barium peroxide in turn results in more barium oxide passing in solution or suspension with the consequent liberation of more heat and the creation of a still higher alkalinity in the mass, thus forming a vicious cycle and, if the original barium peroxide employed contains sufficient amount of such compounds capable of generating heat and forming alkaline compounds, such barium peroxide would be virtually useless for the successful, economical manufacture of hydrogen peroxide commercially, even though the $BaO_2$ content thereof approximated 86%, which content would ordinarily indicate that it could be successfully employed for such purpose. Furthermore, the extraneous soluble compounds contained in such barium peroxide, such as enumerated above, even if not present in sufficient quantities to result in the objectionable decomposition of the barium peroxide during the slaking process, nevertheless, react with the acid employed in the second stage of the manufacture wherein such slaked barium peroxide is converted into hydrogen peroxide, thus necessitating the employment of an additional amount of acid in the conversion stage with an attendant increase in cost.

My investigations have led to the discovery that if commercial barium peroxide which is to be employed for the production of hydrogen peroxide is first subjected to a washing action of a large quantity of water sufficient to effect a thin suspension of such peroxide in the water, instead of merely sufficient to produce a pasty mass as heretofore produced in the aforesaid slaking operation previously employed, it is possible to dissolve out all of the heat-generating or alkaline-producing constituents of such barium peroxide, since the large proportion of water present not only serves to more effectively dissolve such compounds, but tends to absorb the heat generated and prevents an undue rise in temperature of the mixture, besides preventing a high degree of alkalinity developing therein, thereby effectively preventing decomposition of the barium peroxide itself, particularly if the proper volume of water be employed as compared to the amount and character of barium peroxide treated. Furthermore, contrary to expectations, the potency of the barium peroxide so treated is actually increased, as for example where commercial barium peroxide, containing 86% $BaO_2$ content and 4% of combined water-soluble constituents, is subjected to such action of a relatively large volume of water, the resultant insoluble mass obtained by filtering off the suspended insoluble ingredients in the suspension and then drying the same will contain substantially 89.6% $BaO_2$, since because of the large amount of water employed, there is substantially no deleterious decomposition of the barium peroxide employed, as well as very little, if any, slaking of such barium peroxide to form hydrous or hydrated barium peroxide, this being due largely both to the prevention of generation of heat and of a high degree of alkalinity in the mass such as would otherwise occur, as above stated.

As an example of the preferred method of manufacturing such high potency barium peroxide and the production of hydrogen peroxide therefrom, the following is given:—

400 parts of commercial barium peroxide, testing 85% to 90% $BaO_2$, and containing say 3% to 6% of water-soluble compounds, such as barium oxide, anhydrous barium hydroxide and barium silicate, is mixed with 1100 parts of water and preferably the temperature of the mixture is maintained between 50° C. and 90° C., as in this range of temperatures the washed peroxide settles easier and the more effective removal of the resultant water-soluble compounds is possible. The mixture is actively stirred for about thirty minutes to one hour and at the expiration of which period the top liquor will be found to titrate between 1% and 2% alkalinity (calculated as BaO). The washed peroxide is then allowed to settle completely, such settling being facilitated by maintaining the temperature within the above range, and then the clear alkaline top liquor is decanted off from the bottom sludge consisting of barium peroxide. The sludge so obtained, which may be, of course, again washed if so desired, is then dried, preferably in an externally heated atmospheric drier at a temperature of about 100° C. and the dried product is then packed and usually shipped to a different plant where hydrogen peroxide is produced therefrom. Usually only a single washing operation is necessary to accomplish the removal of in excess of 90% of the water-soluble and heat-generating constituents from the as yet unslaked slurry of barium peroxide.

When the suspended unslaked barium peroxide, obtained by hydrolyzing commercial barium peroxide with a large amount of water in the manner above described, is observed through the glass bottom of a vessel, no portions of the mass so observed will appear to be undergoing severe reaction, whereas if commercial barium peroxide is slaked in the customary manner, such as previously specified, by merely incorporating therewith sufficient water to form a pasty mass, it will be observed that there are innumerable small areas wherein severe reaction is in progress, irrespective of how vigorously the mixture is stirred, and from these areas large bubbles are evolved which apparently consist of a mixture of water vapor and oxygen, since the heat of reaction generated in these areas suffices to raise the temperature locally to at or near the boiling point of water and at such temperature the rapid decomposition of barium peroxide into barium oxide and oxygen occurs.

Hydrogen peroxide is formed from my improved anhydrous or unslaked barium peroxide, produced as aforesaid, either by slaking the dried product in the customary manner by adding just sufficient water thereto to form a pasty mass or, in those cases where the manufacture of the barium peroxide and hydrogen peroxide are carried out in the same plant, the wet slurry of unslaked barium peroxide is mixed directly with the slaking water without resorting to the previous drying thereof. The slaked mixture, whether prepared from the dry unslaked barium peroxide or such unslaked slurry, is acidified in the well known manner with a dilute solution of a strong mineral acid, such as sulfuric acid or phosphoric acid, and the resultant hydrogen peroxide solution is separately recovered, as for example by a decanting operation, from the resultant insoluble barium salt.

In the subsequent production of hydrogen peroxide from the anhydrous barium peroxide which I obtain as a result of the first or washing stage, the amount of acidifying acid which is necessary to employ is substantially less than that usually required for treating an equivalent amount of barium peroxide which has not been subjected to such first or washing stage, due to the unusually low alkalinity thereof as compared with the alkalinity of the slaked solution which would be obtained were such first or washing stage omitted. Owing to the fact that the BaO2 content of the product resulting from such first or washing stage is substantially increased over that of the commercial barium peroxide originally employed, for example, as previously stated, it has been found where the original BaO2 content of the commercial barium peroxide employed was 86%, it was increased to 89.6% in the washed product, it is possible to obtain a substantially increased yield in the amount of hydrogen peroxide which may ultimately be obtained from the commercial barium peroxide employed as compared with the usual procedure when operating on a similar commercial barium peroxide.

Instead of decanting off the solution from the heavy barium peroxide slurry, the separation may, if desired be effected by filtration and such latter method of separation, being more effective, is to be preferred in those cases where an extremely pure unslaked barium peroxide is sought.

The period of the hydrolysis of the suspended anhydrous barium peroxide should be at least sufficient to effect the solution of the major portion of the impurities which react exothermically with water to form alkaline-reacting solutions but insufficient to accomplish the substantial and deleterious slaking of the barium peroxide to hydrated barium peroxide. Accordingly, in most instances, depending upon the amount of such impurities originally present in the barium peroxide treated, such hydrolysis should be continued for at least fifteen minutes and not over one hour.

The term "hydrolyzing" as used in the claims refers to the prolonged treatment with large volumes of water, as distinguished from a lixiviating action wherein, as in a filter bed, the water passes through the material being treated so that but a relatively small quantity of the water is at any time acting upon the material so treated.

The term "slaking" as employed herein is intended to refer to the formation of hydrates through decomposition of the anhydrous barium peroxides into barium hydrate and oxygen. Contrary to what would be generally expected and for the reasons herein set forth, such slaking is inhibited to a remarkable degree, rather than being promoted, by the employment of large quantities of water and sufficient to form a thin suspension of the barium peroxide treated.

Various modifications from the foregoing procedure within the scope of the appended claims may be made without departing from the spirit of my invention.

Having thus described my invention, what I claim and desire to obtain by United States Letters Patent is:—

1. The method of fortifying and purifying commercial barium peroxide containing substantial percentages of water-soluble impurities which comprises first thoroughly admixing such commercial barium peroxide with sufficient water to form a thin suspension thereof and sufficient to substantially inhibit the substantial slaking of such barium peroxide to form hydrous barium peroxide, maintaining contact between such barium peroxide and the water so admixed therewith for a considerable period of time and sufficient to dissolve the major portion of the water-soluble heat-generating and alkaline-reacting impurities from said barium peroxide but insufficient to accomplish the substantial and deleterious slaking of barium peroxide to hydrated barium peroxide and then recovering the resultant insoluble barium peroxide separately from the solution containing such dissolved impurities.

2. The method of fortifying and purifying commercial barium peroxide containing substantial percentages of water-soluble impurities which comprises first thoroughly admixing such commercial barium peroxide with sufficient water to form a thin suspension thereof and sufficient to substantially inhibit the substantial slaking of such barium peroxide to form hydrous barium peroxide, maintaining contact between such barium peroxide and the water so admixed therewith for a considerable period of time and sufficient to dissolve the major portion of the water-soluble heat-generating and alkaline-reacting impurities from said barium peroxide but insufficient to accomplish the substantial and deleterious slaking of barium peroxide to hydrated barium peroxide, then recovering the resultant insoluble barium peroxide separately from the solution containing such dissolved impurities and then reducing the barium peroxide so obtained to a dry condition.

3. The method of making hydrogen peroxide from barium peroxide, which comprises first hydrolyzing commercial barium oxide, containing impurities, which react exothermically with water to form an alkaline solution, with a relatively large amount of water and sufficient to effect the thin suspension of the barium peroxide in the water and to substantially prevent noticeable active decomposition and substantial evolution of oxygen from such suspended barium peroxide, while maintaining the temperature of the mixture between 50° C. and 90° C. during at least a portion of the lixiviation stage, separately recovering the barium peroxide, slaking the recovered barium peroxide with a relatively small quantity of water so as to form a pasty mass and then acidifying the slaked mass with a dilute acid and recovering the hydrogen peroxide so formed separately from the resultant barium salt.

4. In the method of purifying commercial barium peroxide containing substantial percentages of impurities which react exothermically with water when dissolved therein and form alkaline-reacting compounds, the step which comprises removing the major portion of such impurities by hydrolyzing such barium peroxide with a relatively large volume of water, at least several parts of water to each part of barium peroxide present, and sufficient to prevent severe local reactions occurring with consequent substantial slaking of such barium peroxide, maintaining contact between such barium peroxide and the water so admixed therewith for a considerable period of time to dissolve substantially all of the water-soluble heat-generating and alkaline-solution forming impurities and then separating the barium peroxide from the solution.

5. In the method of purifying and fortifying anhydrous barium peroxide to enhance the usefulness thereof for the production of hydrogen peroxide, the step which comprises lixiviating commercial anhydrous barium peroxide, containing water-soluble impurities which react exothermically with water to form alkaline solutions, with a relatively large quantity of water and sufficient to prevent the substantial slaking of the barium peroxide to form hydrated barium peroxide and also sufficient to prevent the generation of sufficient heat locally throughout the solution to substantially decompose the anhydrous barium peroxide into barium oxide and oxygen.

6. In the method of purifying barium peroxide, the steps which comprises subjecting anhydrous barium peroxide containing a substantial amount of water-soluble impurities capable of reacting exothermically with water to form an alkaline-reacting solution, to the hydrolyzing action of water, at least several parts of water to each part of anhydrous barium peroxide so treated and sufficient to form a thin suspension of the latter, while maintaining the temperature of the mixture between 50° C. and 90° C. and continuing such hydrolyzing action on such barium peroxide, for a sufficient time, at least one-quarter of an hour and not exceeding three quarters of an hour, to effect the solution of such impurities without effecting the substantial conversion of the barium peroxide into hydrated barium peroxide.

JAMES B. PIERCE, Jr.